(12) United States Patent
Katz et al.

(10) Patent No.: US 8,352,802 B2
(45) Date of Patent: Jan. 8, 2013

(54) METHOD AND SYSTEM FOR REMOTE DIAGNOSTICS

(75) Inventors: Hagay Katz, Moshav Herut (IL); Eyal Bychkov, Hod Hasharon (IL); Itay Sherman, Hod Hasharon (IL)

(73) Assignee: Google Inc., Mountain View, CA (US)

( * ) Notice: Subject to any disclaimer, the term of this patent is extended or adjusted under 35 U.S.C. 154(b) by 392 days.

(21) Appl. No.: 11/893,837

(22) Filed: Aug. 16, 2007

(65) Prior Publication Data

US 2009/0049343 A1 Feb. 19, 2009

(51) Int. Cl.
*G06F 11/00* (2006.01)

(52) U.S. Cl. .......................................... 714/46; 709/223

(58) Field of Classification Search ...................... 714/46
See application file for complete search history.

(56) References Cited

U.S. PATENT DOCUMENTS

| | | | |
|---|---|---|---|
| 5,410,706 A * | 4/1995 | Farrand et al. ..................... 713/2 |
| 5,455,933 A * | 10/1995 | Schieve et al. ................... 714/27 |
| 5,625,673 A | 4/1997 | Grewe et al. |
| 5,628,055 A | 5/1997 | Stein |
| 5,732,268 A * | 3/1998 | Bizzarri ............................ 713/2 |
| 5,809,115 A | 9/1998 | Inkinen |
| 5,893,037 A | 4/1999 | Reele et al. |
| 5,907,815 A | 5/1999 | Grimm et al. |
| 5,961,594 A * | 10/1999 | Bouvier et al. ............... 709/223 |
| 6,175,934 B1 * | 1/2001 | Hershey et al. ................. 714/25 |
| 6,188,917 B1 | 2/2001 | Laureanti |
| 6,201,867 B1 | 3/2001 | Koike |
| 6,243,578 B1 | 6/2001 | Koike |
| 6,338,150 B1 * | 1/2002 | Johnson et al. .................. 714/39 |
| 6,438,711 B2 * | 8/2002 | Woodruff ......................... 714/27 |
| 6,477,357 B1 | 11/2002 | Cook |
| 6,499,114 B1 * | 12/2002 | Almstead et al. ............... 714/25 |
| 6,516,202 B1 | 2/2003 | Hawkins et al. |
| 6,594,657 B1 * | 7/2003 | Livowsky ......................... 707/5 |

(Continued)

FOREIGN PATENT DOCUMENTS

EP 1871075 A1 12/2007

(Continued)

OTHER PUBLICATIONS

SYMANTEC: PCAnywhere 12.5; http://eval.symantec.com/mktginfo/enterprise/fact_sheets/b-datasheet_pcanywhere_12_5_10_2008.pdf.

(Continued)

*Primary Examiner* — Kamini Patel
(74) *Attorney, Agent, or Firm* — Soquel Group LLC

(57) ABSTRACT

A diagnostic system for computers, including a connector interface for connecting the diagnostic system to a PC, a storage medium for storing executable instructions that boot the PC when the diagnostic system is connected to the connector interface, for storing diagnostic testing program code that scans and tests the PC, and for storing a phone number for a remote online help-desk facility, a modem for communicating wirelessly with the online help-desk facility when the PC is not fully operational, and for enabling the remote online help-desk facility to remotely run the diagnostic testing program code on the PC and view the results, an audio subsystem for enabling voice communication between a user and a representative at the remote online help-desk facility, and a processor for controlling the storage medium, the modem and the audio subsystem. A method is also described and claimed.

14 Claims, 4 Drawing Sheets

U.S. PATENT DOCUMENTS

| | | | |
|---|---|---|---|
| 6,640,113 B1 | 10/2003 | Shim et al. | |
| 6,651,190 B1* | 11/2003 | Worley et al. | 714/43 |
| 6,690,947 B1 | 2/2004 | Tom | |
| 6,898,283 B2 | 5/2005 | Wycherley et al. | |
| 6,907,264 B1 | 6/2005 | Sterkel | |
| 6,978,307 B2* | 12/2005 | Goldstein | 709/227 |
| 6,999,792 B2 | 2/2006 | Warren | |
| 7,085,542 B2 | 8/2006 | Dietrich et al. | |
| 7,194,285 B2 | 3/2007 | Tom | |
| 7,225,357 B2* | 5/2007 | Tai et al. | 714/25 |
| 7,266,391 B2 | 9/2007 | Warren | |
| 7,269,761 B2* | 9/2007 | Yi | 714/46 |
| 7,349,964 B2* | 3/2008 | Motoyama et al. | 709/224 |
| 7,647,527 B2* | 1/2010 | Duan et al. | 714/25 |
| 2002/0007237 A1 | 1/2002 | Phung et al. | |
| 2002/0090980 A1 | 7/2002 | Wilcox et al. | |
| 2002/0136165 A1 | 9/2002 | Ady | |
| 2002/0151327 A1 | 10/2002 | Levitt | |
| 2002/0184385 A1 | 12/2002 | Kato | |
| 2004/0076266 A1* | 4/2004 | Rudolf | 379/1.03 |
| 2004/0202015 A1* | 10/2004 | Tai et al. | 365/154 |
| 2004/0233930 A1 | 11/2004 | Colby, Jr. | |
| 2004/0236843 A1 | 11/2004 | Wing et al. | |
| 2004/0268005 A1 | 12/2004 | Dickie | |
| 2005/0070225 A1 | 3/2005 | Lee | |
| 2005/0159184 A1 | 7/2005 | Kerner et al. | |
| 2005/0273662 A1* | 12/2005 | Yi | 714/31 |
| 2006/0003804 A1 | 1/2006 | Liu | |
| 2006/0105722 A1 | 5/2006 | Kumar | |
| 2006/0195551 A1 | 8/2006 | Dowling | |
| 2006/0227517 A1 | 10/2006 | Zayas et al. | |
| 2006/0230312 A1* | 10/2006 | Nichols et al. | 714/25 |
| 2006/0241353 A1 | 10/2006 | Makino et al. | |
| 2007/0004450 A1 | 1/2007 | Parikh | |
| 2007/0018957 A1 | 1/2007 | Seo | |
| 2007/0079030 A1 | 4/2007 | Okuley et al. | |
| 2007/0161404 A1 | 7/2007 | Yasujima et al. | |
| 2007/0207800 A1* | 9/2007 | Daley et al. | 455/425 |
| 2007/0288583 A1 | 12/2007 | Rensin et al. | |
| 2008/0009325 A1 | 1/2008 | Zinn et al. | |
| 2008/0026794 A1 | 1/2008 | Warren | |
| 2008/0040354 A1 | 2/2008 | Ray et al. | |
| 2008/0140886 A1 | 6/2008 | Izutsu | |
| 2009/0010247 A1* | 1/2009 | Stille | 370/352 |

FOREIGN PATENT DOCUMENTS

| | | |
|---|---|---|
| WO | 9421058 A1 | 9/1994 |
| WO | 0059247 A1 | 10/2000 |
| WO | 0186922 A1 | 11/2001 |
| WO | 03103174 A1 | 12/2003 |

OTHER PUBLICATIONS

BOMGAR: Remote Support and Help Desk Virtualization Documents; http://www.bomgar.com/virtualsupportsolutions/documents.htm.

ULTRAVNC: Remote Support Software, Remote Support Tool, Remote Desktop Control, Remote Access Software, PC Remote Control; http://www.uvnc.com/index.html.

NETSUPPORT 24-7; http://www.netsupport247.com/resources/NS24-7_e_Book_UK_Standard2.pdf.

LINKTIVITY: Web Conferencing, Remote Support, Collaboration Software, Conferencing Software, Online Meeting, Help Desk Software; http://www.linktivity.com/white_papers.html.

* cited by examiner

METHOD AND SYSTEM FOR REMOTE DIAGNOSTICS

FIELD OF THE INVENTION

The field of the present invention is computer technical support.

BACKGROUND OF THE INVENTION

The advancement of computer technology and the affordability of fast microprocessors and large storage disks has led to the proliferation of powerful computers among consumers. One of the challenges in keeping pace with the ever expanding market of personal computers, is providing technical support for computer-related problems. Conventional technical support is provided via help desk support, via phone calls, vie websites, via e-mail and, in case of difficult problems, via technician house calls.

A growing service that has emerged in the past years is that of the online help-desk. Online help-desks originally used voice conversation or chat messaging for technical support. Currently, some online help desks use remote control applications, which enable a technician to remotely interact with an afflicted computer over the Internet, or over a company LAN. Such remote control applications may provide the technician with the same level of control as if he were sitting in front of the afflicted computer itself. Examples of such remote control applications include (i) PcAnywhere® developed and marketed by Symantec Corporation of Cupertino, Calif., (ii) Bomgar™ PC remote control software developed and marketed by Bomgar Corporation of Ridgeland, Miss., (iii) UltraVNC PC remote control software developed and marketed by Ultr@VNC, and (iv) NetSupport 24-7 developed and marketed by NetSupport, Inc. of Alpharetta, Ga. Some remote control applications integrate voice conversation and text chat with customer support, during a support session, such as (v) Linktivity®, marketed and developed by Inter-Tel, Inc. of Tucson, Ariz.

Reference is now made to FIG. 1, which is a prior art illustration of an online help-desk system. Shown in FIG. 1 is an afflicted personal computer (PC) 100, which connects to a remote help-desk 110 via an Internet gateway 120. Computer 100 runs remote control software that enables a technician using help-desk 110 to take control of computer 100, including keyboard and mouse input control, with output displayed to the technician. In particular, the technician is able to run diagnostic testing tools such as anti-virus software and registry scan software, and see the results of the tests.

A drawback with current help-desk technology is that it requires an operational Internet connection. As such, in cases where there is no available Internet connection or if the problem itself is lack of Internet connectivity, online help-desk support is useless.

It would thus be of advantage to have a help-desk technology that provides remote technical support without requiring that the afflicted computer be able to connect to the Internet.

SUMMARY OF THE DESCRIPTION

Aspects of the present invention concern methods and systems for providing remote online help-desk technical support to a personal computer (PC) that is not fully operational, including circumstances where the PC is unable to connect to the Internet. The present invention includes a diagnostic device, referred to herein as a "diagnoser", which connects to the PC and remotely communicates with a remote online help-desk facility.

The diagnoser is generally used in combination with voice communication between a user of the PC and a help-desk support person. The help-desk support person guides the user in performing several actions, until the help-desk support person is able to take control of the PC. Such actions include inter alia connecting the diagnoser to the PC, turning the PC off and on, and selecting an option from a menu displayed on the screen. For users that are not skilled with technical support operations, voice communication enables the help-desk person to explain each action to the user.

The diagnoser includes boot instructions in its disk drive and, as such, can be used to boot the PC when it is connected to the PC. The diagnoser also includes diagnostic testing program code, which the PC runs from the diagnoser's disk, that scans and tests the PC. The diagnoser further includes a modem that provides a wireless communication socket with the remote online help-desk facility.

Thus, by using the diagnoser of the present invention, together with PC remote control software, a technical support person at a remote online help-desk facility, is able to run diagnostic scans and tests on the afflicted PC and view the scan and test results, in order to resolve the problem with the PC, without requiring that the PC have Internet connectivity.

It will thus be appreciated by those skilled in the art that although the afflicted PC is unable to make an Internet connection, the online help-desk facility is nevertheless able to remotely control the PC via use of the diagnoser of the present invention, to run diagnostic scans and tests, and to provide the necessary technical support.

There is thus provided in accordance with an embodiment of the present invention a diagnostic system for computers, including a connector interface for connecting the diagnostic system to a PC, a storage medium for storing executable instructions that boot the PC when the diagnostic system is connected to the connector interface, for storing diagnostic testing program code that scans and tests the PC, and for storing a phone number for a remote online help-desk facility, a modem for communicating wirelessly with the online help-desk facility when the PC is not fully operational, and for enabling the remote online help-desk facility to remotely run the diagnostic testing program code on the PC and view the results, an audio system for enabling voice communication between a user and a representative at the remote online help-desk facility, and a processor for controlling the storage medium, the modem and the audio system.

There is moreover provided in accordance with an embodiment of the present invention a method for diagnosing a computer that is not fully operational, including enabling voice communication between a user and a representative at a remote on-line help-desk facility, communicatively connecting a diagnostic system (i) to a PC that is not fully operational, and (ii) to the online help-desk facility, booting the PC from a disk drive on the diagnostic system, remotely running diagnostic testing program code stored in the diagnostic system on the PC, from the online help-desk facility, and remotely viewing the results of the diagnostic testing program code, from the online help-desk facility.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to providing remote technical support for a PC that is unable to connect to the Internet. The present invention includes a diagnostic device, referred to as a "diagnoser", that enables a remote online help-desk facility to run diagnostic scans and tests on the PC, where the diagnostic program code resides on the diagnoser's disk. The diagnoser is also able to boot the PC, in case the PC's operating system is not functional. The diagnoser also provides a voice channel for audio guidance.

Figure 1:
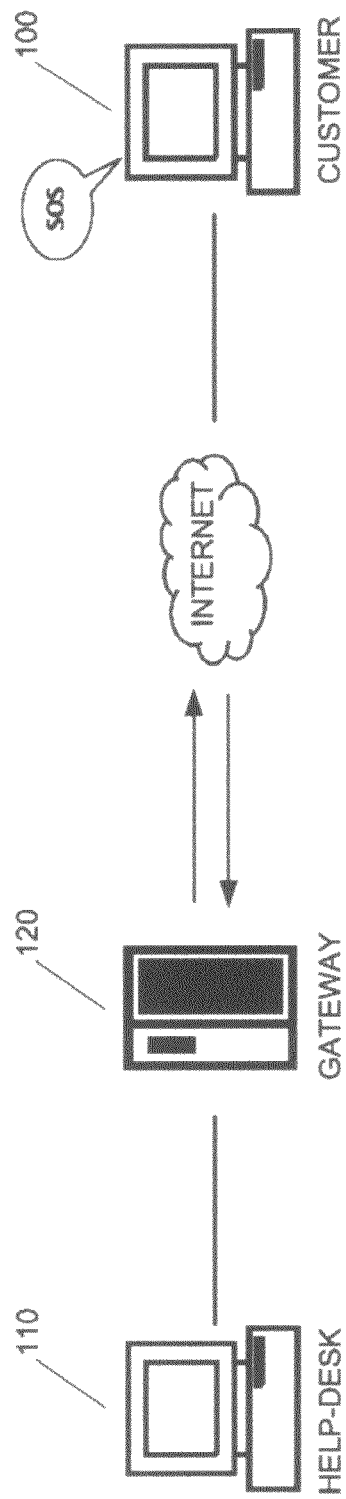
FIG. 1 is a prior art illustration of an online help-desk system.
Figure 2:
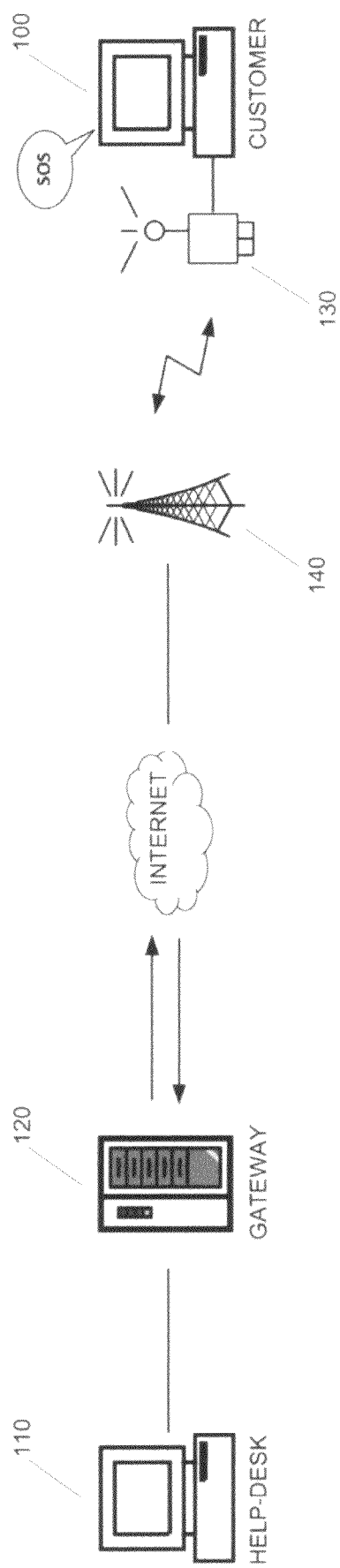
FIG. 2 is an illustration of a system for online technical support using a diagnoser device, in accordance with an embodiment of the present invention.

Reference is now made to FIG. 2, which is an illustration of a system for online technical support using a diagnoser, in accordance. with an embodiment of the present invention. Shown in FIG. 2 is an afflicted PC 100 that requires technical support from a remote help-desk 110. Help-desk 110 is accessible over the Internet via a gateway 120. However, computer 100 may not be able to connect to the Internet.

Also shown in FIG. 2 is a diagnoser 130 that is able to communicate with help-desk 110 even when computer 100 is unable to do so by itself. Diagnoser 130 includes a cellular modem, and connects to the Internet via a cellular base station 140. Diagnoser 130 provides a cellular link to computer 100, and also provides diagnostics software to computer 100. Diagnoser 130 functions as a mediator for storing appropriate diagnostic software, or downloading such software from server computers, and running the software on computer 100.

In accordance with an embodiment of the present invention, diagnoser 130 is connected to computer 100 via a USB or an SD connection. Diagnoser 130's storage is thus exposed to computer 100, and computer 100 is able to run the diagnostics software remotely from diagnoser 130's memory.

Depending on the criticality of computer 100's state, there are two modes of diagnostics. If computer 100 is in a critical state and is not generally operable, then diagnoser 130 serves as a rescue boot device. When diagnoser 130 is connected to computer 100, computer 100 recognizes diagnoser 130 as a boot device, and is able to boot start itself from diagnoser 130. In this regard, it is noted that most BIOS's enable USB bootability. After computer 100 is booted, the diagnostics software residing in diagnoser 130 is executed.

The diagnostics software runs system utilities on computer 100 without starting computer 100's operating system, or alternatively with a minimal operating system. The diagnostic software analyzes the state of computer 100's operating system (OS). The diagnostic software searches for damaged OS files, based on a priori knowledge about the files. If damaged OS files are discovered, then good files are fetched locally or downloaded, and copied to the proper location in computer 100. Control is then returned to computer 100.

If computer 100 is not in a critical state and is generally operable, then when diagnoser 130 is connected to computer 100, computer 100 recognizes that a new device is connected, and begins auto-playing the remote diagnostics software residing in diagnoser 130.

In either of the above modes of diagnostics, when computer 100 runs the diagnostics software, a connection is established between diagnoser 130 and help-desk 110. If computer 100 is able to establish an Internet connection, then such connection is preferred. However, if computer 100 is unable to make an Internet connection, the wireless cellular modem within diagnoser 130 is used instead. In accordance with an embodiment of the present invention, the connection between diagnoser 130 and help-desk 110 is a dual transfer mode (DTM) connection, which enables both a circuit switched (CS) connection and a packet switched (PS) session.

In turn, this enables a conversation with a help-desk representative while he diagnoses and fixes computer 100's problem. The help-desk representative instructs a user regarding operations to perform with diagnoser 130; e.g., "Connect the diagnoser to the USB port", "turn the computer off and then on again", "what do you see on the screen". Such conversation often relies on the on-board voice communication in diagnoser 130, in cases where a telephone line is not near computer 100.

The help-desk representative is afforded remote control of computer 100. If computer 100 was booted from diagnoser 130, then the remote control of computer 100 may be limited to running applications that reside on diagnoser 130. If computer 100 was able to start its own operating system, then the remote control of computer 100 will include running applications that reside on computer 100 as well as applications that reside on diagnoser 130. Such diagnostic applications include inter alia anti-virus software and registry scan software.

Figure 3:
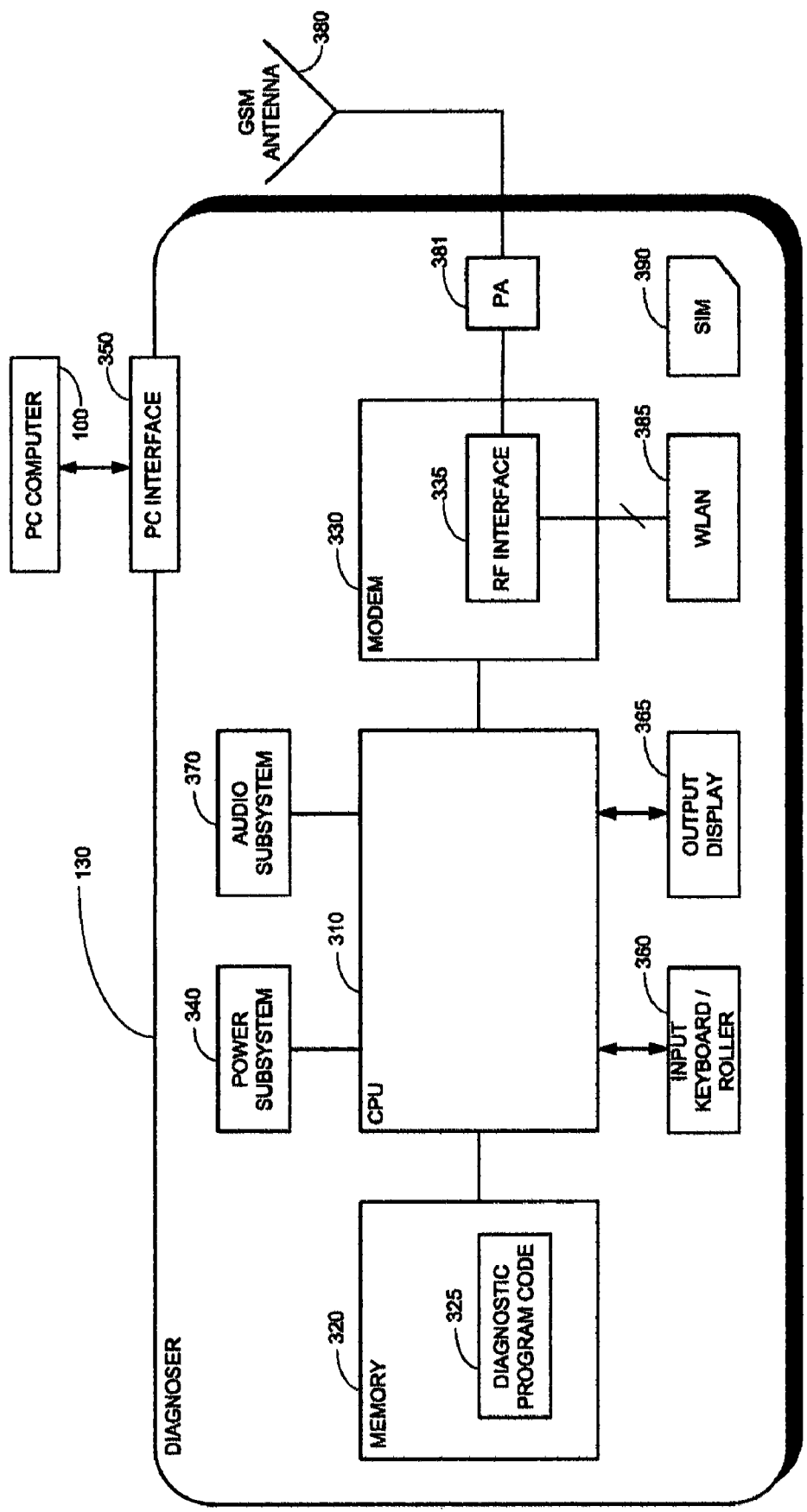
FIG. 3 is a simplified block diagram of a diagnoser device, in accordance with an embodiment of the present invention.
Figure 4:
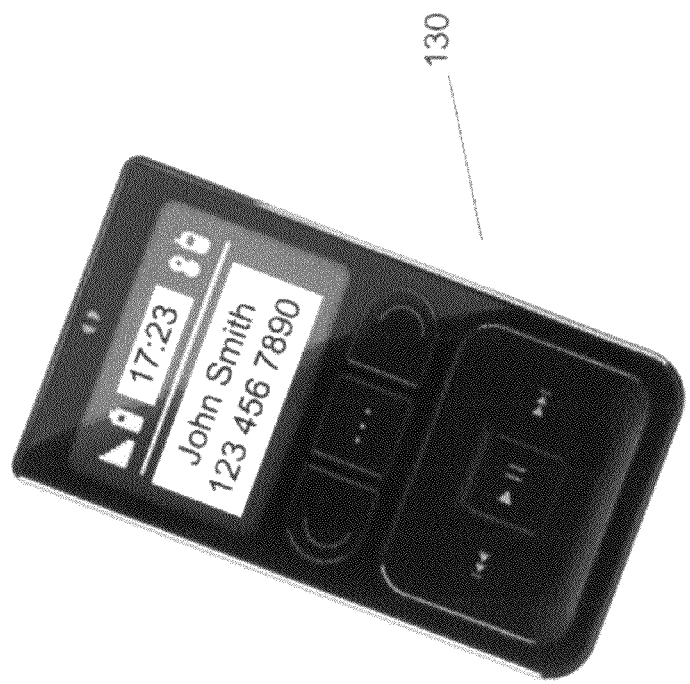
FIG. 4 is a picture of a physical diagnoser, in accordance with an embodiment of the present invention.

Reference is now made to FIG. 3, which is a simplified block diagram of diagnoser 130, in accordance with an embodiment of the present invention. Reference is also made to FIG. 4, which is a picture of a physical diagnoser 130, in accordance with an embodiment of the present invention. As shown in FIG. 3, principal components of diagnoser 130 include a processor 310, a memory 320 storing diagnostic program code 325 and a prescribed help-desk phone number, a communication modem 330, an internal power source 340, a PC interface 350 and, optionally, a user interface including an input device 360 and an output display 365. Input device 360 and output display 365 may be used to operate computer 100 in conjunction with a remote help-desk representative.

Diagnoser 130 also includes an audio subsystem 370, used for conversation with the help-desk, which is generally contemporaneous with diagnostic testing and remote control of computer 100.

Modem 330 sends and receives audio signals via a GSM antenna 380 that is connected to a power amplifier 381. Modem 330 sends and receives digital signals via a wireless LAN 385. Wireless LAN 385 enables diagnoser 130 to use a Wi-Fi connection as an alternative to a cellular modem connection. Diagnoser 130 also includes a SIM card 390 for GSM connection.

Figure 5:
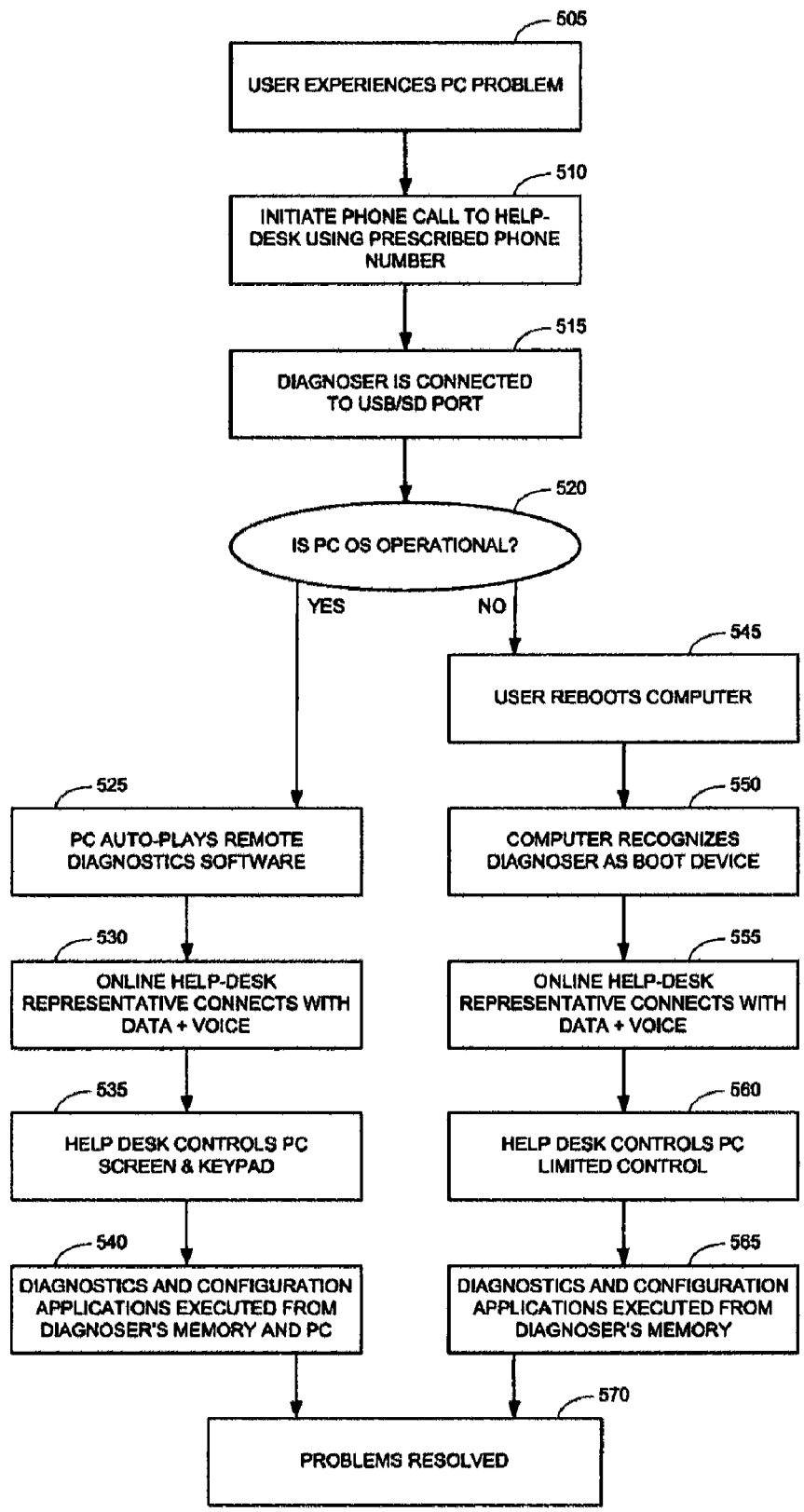
FIG. 5 is a simplified flowchart for operation of a diagnoser device, in accordance with an embodiment of the present invention.

Reference is now made to FIG. 5, which is a simplified flowchart for operation of diagnoser 130, in accordance with an embodiment of the present invention. At step 505 a user experiences a problem with his PC, which has become afflicted. At step 510 a diagnoser initiates a phone call to a help-desk, using a prescribed phone number stored in memory of the diagnoser.

At step 515 the diagnoser is connected to the USB or SD port of the PC. At step 520 a determination is made as to whether or not the PC's operating system is operational. If so, then at step 525 the PC recognizes the diagnoser as a connected device, and begins auto-playing diagnostics software that is stored in the diagnoser's memory.

At step 530 an online help-desk representative opens a data connection with the PC and makes a voice connection with the user. At step 535 the help-desk representative remotely controls the PC. At step 540 the help-desk representative runs diagnostics testing tools and configuration tools that reside on the PC or on the diagnoser, or both. The method then proceeds to step 570.

Referring back to step 520, if the PC's operating system is not operational, then at step 545 the user reboots the PC from the diagnoser, which serves as a boot device. At step 550 the PC recognizes the diagnoser. At step 555 the help-desk representative opens a data connection with the PC, and makes a voice connection with the user. At step 560 the help-desk representative takes limited remote control of the PC. At step 565 the help-desk representative runs diagnostic testing software on the PC, using software residing on the diagnoser. Finally, at step 570 the help-desk representative is able to resolve the afflicted PC problem.

In the foregoing specification, the Invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A diagnostic apparatus for computers, comprising a diagnoser that connects to a PC, comprising:
    an SD connector for connecting the diagnoser to an SD port of a PC;
    a storage medium for storing diagnostic program code that automatically runs on the PC via said SD connector, in response to connecting the diagnoser to the SD port of the PC, and for storing an identifier of a remote online help-desk facility;
    a modem for communicating wirelessly with the remote online help-desk facility using the stored identifier, for enabling the remote online help-desk facility to remotely perform diagnostic tests on the PC, via the diagnostic program code, and for transmitting the test results to the remote online help-desk facility; and
    a processor for controlling said storage medium and said modem.

2. The diagnostic apparatus of claim 1 further comprising a battery for powering said processor.

3. The diagnostic apparatus of claim 1 wherein said modem communicates in dual transfer mode (DTM), providing both a circuit switched (CS) connection and a packet switched (PS) session.

4. The apparatus of claim 1 wherein said storage medium stores executable instructions for booting the PC.

5. The diagnostic apparatus of claim 1 further comprising an audio subsystem for communicating voice between a user and a representative at the remote online help-desk facility via the diagnoser.

6. The diagnostic apparatus of claim 1 wherein said processor is operable to copy replacement operating system files to the PC, via said SD connector, when the diagnostic tests indicate that operating system files in the PC are damaged.

7. The diagnostic apparatus of claim 6 wherein the replacement operating system files are resident on said storage medium.

8. The diagnostic apparatus of claim 6 wherein said processor is further operable to download the replacement operating system files via said modem.

9. A method for diagnosing a computer that is not fully operational, comprising:
    recognizing connection of a diagnostic device to an SD port of a PC via an SD connector;
    communicating data between the PC and a remote on-line help desk facility, via the diagnostic device, using an identifier of the remote on-line help desk facility stored in the diagnostic device;
    automatically running diagnostic program code stored in the diagnostic device on the PC via the SD connector, in response to said recognizing connection;
    performing diagnostic tests on the PC, via the diagnostic program code, from the remote online help-desk facility; and
    transmitting the test results to the remote online help-desk facility.

10. The method of claim 9 wherein said enabling data communication enables a dual transfer mode (DTM) connection, providing both a circuit switched (CS) connection and a packet switched (PS) session.

11. The method of claim 9 further comprising booting the PC from the diagnostic device, if the PC operating system is not currently operational.

12. The method of claim 9 further comprising-communicating voice between a user of the PC and a representative at the remote on-line help desk facility, via the diagnostic device.

13. The method of claim 9 further comprising copying replacement operating system files to the PC, via the SD connector, when said performing diagnostic tests indicates that operating system files in the PC are damaged.

14. The method of claim 13 further comprising downloading the replacement operating system files.

* * * * *